United States Patent [19]
Okada

[11] Patent Number: 4,863,671
[45] Date of Patent: Sep. 5, 1989

[54] PLASMA CONFINEMENT SYSTEM
[75] Inventor: Osami Okada, Chofu, Japan
[73] Assignee: Hitachi, Ltd., Tokyo, Japan
[21] Appl. No.: 56,658
[22] Filed: Jun. 2, 1987
[30] Foreign Application Priority Data
  Jun. 2, 1986 [JP] Japan ................................ 61-125744
[51] Int. Cl.$^4$ ............................................. G21B 1/00
[52] U.S. Cl. .................................... 376/143; 376/142
[58] Field of Search ............... 376/123, 132, 139, 140, 376/142, 143, 107

[56] References Cited
U.S. PATENT DOCUMENTS

| | | | |
|---|---|---|---|
| 3,093,569 | 6/1963 | Post ..................................... | 376/139 |
| 3,096,269 | 7/1963 | Halbach et al. ..................... | 376/107 |
| 3,132,996 | 5/1964 | Baker et al. ......................... | 376/107 |
| 3,171,788 | 3/1965 | Gorman et al. ..................... | 376/107 |
| 3,343,020 | 9/1967 | Gordon ................................ | 376/107 |
| 3,442,758 | 5/1969 | Penfold et al. ..................... | 376/123 |
| 3,624,240 | 11/1971 | Damm et al. ....................... | 376/140 |

FOREIGN PATENT DOCUMENTS
  100891 6/1984 Japan.
  8402803 7/1984 World Int. Prop. O..

OTHER PUBLICATIONS
Japanese Journal of Applied Physics, vol. 23, No. 11, Part 1, Nov. 1984, pp. 1475–1481.
Peuron et al., "Thermomagnetic Control of the Operating Point of Magnetic Fusion Reactors," *IEEE Trans. on Magnetics*, vol. Mag-17, No. 6, pp. 3459–3462, Nov. 1981.

Primary Examiner—Deborah L. Kyle
Assistant Examiner—Richard W. Wendtland
Attorney, Agent, or Firm—Antonelli, Terry & Wands

[57] ABSTRACT

A plasma confinement system comprising a toroidal vacuum chamber, a toroidal coil which generates a magnetic field in a toroidal direction within the vacuum chamber, current transformer coils which are wound in the toroidal direction, equilibrium magnetic field coils which are wound in the toroidal direction in order to control a plasma, alternating current coils which are wound mainly in the toroidal direction and through which alternating currents are caused to flow for enabling forming and rotating of a deformed magnetic surface and for causing rotation of the plasma in a poloidal direction, and power sources which cause currents to flow through the various coils.

7 Claims, 2 Drawing Sheets

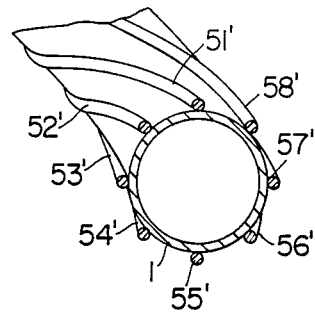
FIG. 4
FIG. 1
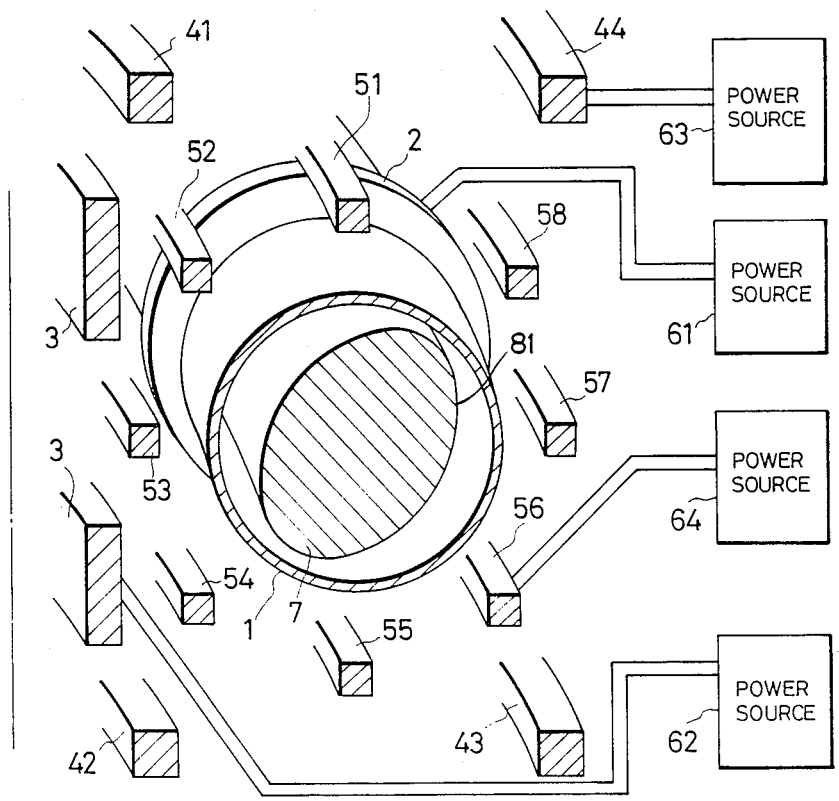

PLASMA CONFINEMENT SYSTEM

BACKGROUND OF THE INVENTION

The present invention relates to a system for plasma confinement by magnetic fields, and more particularly to a plasma confinement system having magnetic field generation equipment which is well suited for the high-density plasma confinement of a nuclear fusion apparatus or the like.

The plasma confinement system produces a plasma within a toroidal vacuum chamber and exerts magnetic fields on the plasma so as to confine the plasma.

Conventional plasma confinement systems are based on pulse operations. With the intention of the A.C. operation of the system, there has been the idea that primary winding coils are excited by the use of alternating current as disclosed in Japanese Patent Application Laid-open No. 100891/1984. The operation on this occasion, however, has been quite equivalent to the ordinary pulse operation as regards the half cycle of the alternation.

In the Tokamak-type confinement system which is a typical conventional system, it is the ballooning instability that forms an obstacle to the future perfection of this system as a nuclear fusion reactor. This instability takes place for the reason that the outward convex part of a plasma swells outwards still more.

The system therefore has the problem that the plasma disappears in a short time and cannot be confined for a long time.

SUMMARY OF THE INVENTION

A general object of the present invention is to provide a plasma confinement system which can confine a plasma for a long time.

Another object of the present invention is to provide a plasma confinement system which can eliminate the instability stated before.

The above objects are accomplished by changing a magnetic surface shape within a plasma. In order to change the magnetic surface shape, currents to coils for establishing magnetic fields within a poloidal surface may be changed. In case of the Tokamak-type system, a poloidal coil system for holding an equilibrium is wound axisymmetrically. When coils for affording the change to the magnetic surface shape are wound axisymmetrically, also the change in the shape becomes axisymmetric. On the other hand, when the coils for affording the change to the magnetic surface shape are wound non-axisymmetrically, the change in the shape becomes non-axisymmetric, but the basic plasma equilibrium can be held axisymmetric.

Usually, the feed of power to the coils has been performed quasi-statically. That is, a single operating state has existed within one operating cycle. With an ordinary change in the shape, a part in which the magnetic line of force is convex outwards cannot be eliminated, and the instability grows. The growth of the instability can be prevented in such a way that the magnetic surface is rotated to rapidly remove the plasma from the unstable position. The rotation of the magnetic surface is achieved by supplying an alternating current to the poloidal coil system with phase shifts.

In the toroidal plasma, the magnetic surface is formed by the magnetic field within a poloidal plane which is established by a plasma current flowing in the lengthwise direction of the toroid and the currents flowing in the coils wound in the lengthwise direction of the toroid, namely, the poloidal coils. When the magnetic field established by the poloidal coils forms a quadrupole field, a nearly circular magnetic surface generated by the plasma current is deformed to be elliptical. When the magnetic field established by the poloidal coils is a hexapole field, the section of the plasma is to be triangular. If the magnetic field established by the poloidal coils is an octupole field, the change in the shape of the section comes to have a quadrilateral component. In general, the relationship between a multipole magnetic field and a sectional shape holds.

When the multipole magnetic field is the quadrupole, four coils are wound in the lengthwise direction of the toroid and are arranged at intervals of about 90° within the poloidal plane, and the coils adjoining each other are supplied with currents in opposite directions. For the hexapole, six coils are arranged at intervals of 60°, and for the octupole, eight coils are arranged at intervals of 45°. A method of power feed to the coils for attaining the rotating magnetic field is as follows: Alternating currents are supplied to the coils for establishing the multipole magnetic field. The alternating currents to be supplied to the adjacent coils are shifted in phase. A phase difference on this occasion is set at:

$$360° \times \frac{N}{2M}$$

Here, 2M indicates the number of the coils, and N indicates the change in the shape to an N-gon. In the configuration of a steady non-rotating magnetic surface, a value equal to N is the lower limit of M. However, in the case where M is equal to N, the phase difference based on the alternating currents becomes 180° in view of the above expression, and the magnetic surface does not rotate. Accordingly, a condition for the rotation is M>N.

With the six coils, the hexapole magnetic field can be realized, but the plasma column can be rotated in the case of up to N=2 deformation based on the quadrupole magnetic field, namely, the elliptical section. With the eight coils, the sections of N=2 and 3 deformations can be rotated. Thenceforth, the same applies. Even if the number of the coils is odd, [(the coil number - 1) ÷ 2]-gonal shape can be rotated in principle. However, the set of even-numbered coils is more advantageous as to the number of power sources and the aspect of wiring because in-phase and anti-phase coils are existent.

Since charged particles are bound to the magnetic line of force, the rotation of the magnetic surface drives the plasma column to rotate in accordance with a peristaltic movement in the rotating direction thereof.

Regarding the instability of the high-density plasma, the ballooning type wherein on the outermost side of the toroid, the plasma protrudes outwards still more, has the greatest growth rate. According to the present invention, the unstable plasma part is quickly moved to the stable part, so that the instability does not grow thereafter.

The growth rate $\gamma$ of the ballooning instability is approximately indicated by the following expression:

$$\gamma = \sqrt{\frac{\nabla n}{n} \frac{v_{th}^2}{R}} \quad (\sec^{-1})$$

Here, n indicates the density of electrons, $v_{th}$ the thermal velocity of ions, R the major radius of the toroid, and ∇ a differential operator indicative of a gradient. Letting ω denote the rotating angular velocity of the magnetic surface, the period of time in which the magnetic surface rotates between the outer side and inner side of the toroid is π/ω. Since the growth of the instability may be little meantime, the following may be held:

$$\omega > \pi\gamma \approx \frac{v_{th}}{r}$$

where $$\nabla n/n \sim \frac{1}{r} \text{ and } \pi x \sqrt{\frac{r}{R}} \sim 1$$

are used for approximation. r denotes the radius of the plasma column. It is indicated by the above expression that the rotating velocity of the magnetic surface is effective when it exceeds the thermal velocity of the ions on the outermost side.

BRIEF DESCRIPTION OF THE DRAWINGS

FIG. 1 is a sketch, partly in section, showing a plasma confinement system which is an embodiment of the present invention;

FIG. 3 is a circuit diagram showing an embodiment which generates and rotates a triangular magnetic surface and FIG. 4 is a sketch showing non-axisymmetric coils.

DETAILED DESCRIPTION OF THE PREFERRED EMBODIMENTS

Figure 2:
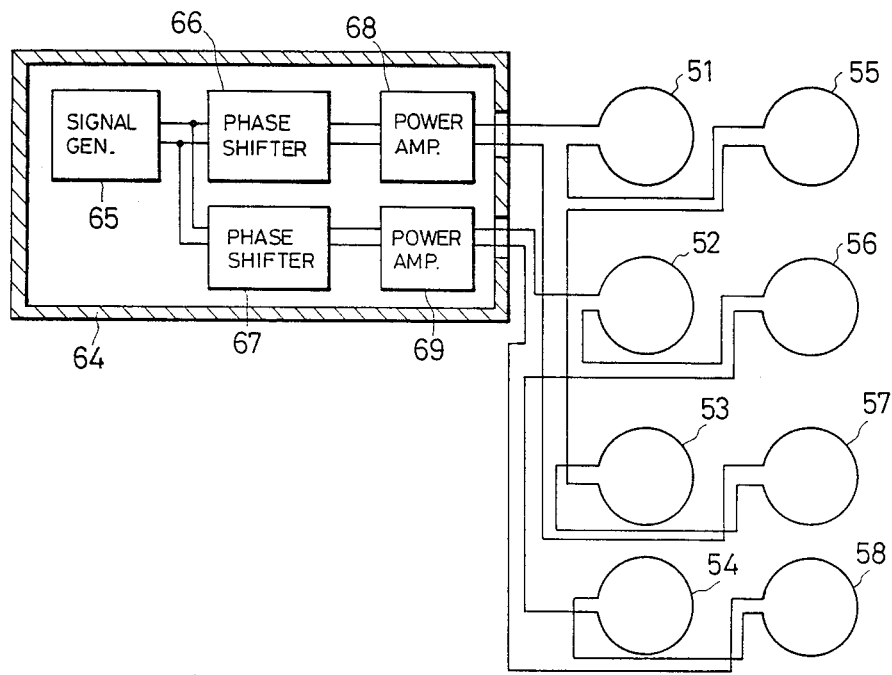
FIG. 2 is a circuit diagram showing an embodiment which generates and rotates an elliptical magnetic surface.

Now, an embodiment of the present invention will be described with reference to FIG. 1.

The system comprises a toroidal vacuum chamber 1 which is substantially axisymmetric, a coil 2 which generates a magnetic field in a toroidal direction mainly within the vacuum chamber 1, current transformer coils 3 which drive current in the toroidal direction in order to generate and maintain a plasma column 7 within the vacuum chamber 1, and coils 41, 42, 43 and 44 which generate magnetic fields for holding the equilibrium of the plasma 7, as well as magnetic field coils 51, 52, 53, 54, 55, 56, 57 and 58 which serve to cause the rotation of a magnetic surface 81. Electric power is supplied by power sources 61, 62, 63 and 64 for feeding the individual coils 41–44 and 51–58.

The current transformer coils 3 serve to induce a magnetic flux change on the center axis of the system. Although they are illustrated as having the air-core setup, it is the same as in the conventional Tokamak system that iron cores may well be employed. The current transformer coils 3 are connected in series with the power source 62, and are fed with pulses. The equilibrium field coils 41, 42, 43 and 44 serve to establish a magnetic field perpendicular to the plane of a plasma ring, and are disposed to be symmetric in the vertical direction. The number of the equilibrium field coils is not always four. In addition, the waveform of power feed from the power source 63 is substantially the same as the waveform of a plasma current, and the coils 41–44 are connected in series. These are the same as in the conventional Tokamak system. The toroidal coil 2 is connected and fed with power similarly to that of the conventional Tokamak system. Although the eight rotating coils 51–58 are illustrated, an elliptical magnetic surface 81 can be rotated even by six coils. A method of power feed in the case of rotating the elliptical magnetic surface with the eight coils will be described.

The elliptical magnetic surface 81 is established by a quadrupole magnetic field. In establishing the quadrupole magnetic field, forward and reverse currents of two cycles around the plasma column are necessary.

If the eight coils are arranged at substantially equiangular intervals, alternating currents which have a phase shift of:

$$2 \times 360°/8 = 90°$$

between the respectively adjacent coils is supplied. Then, the elliptical magnetic surface is rotated ½ revolution in one cycle of the alternation. In order to rotate a triangular magnetic surface by the use of the eight coils, the following measure may be taken: Since a triangular deformation is established by a hexapole magnetic field, alternating currents having a phase difference of:

$$3 \times 360°/8 = 135°$$

between the respectively adjacent coils are supplied, whereby the magnetic surface rotation of ⅓ revolution is achieved in a cycle of the alternation.

The relationship among the number of coils, the sectional shape and the magnitude of revolution becomes as follows: Letting the number of coils be 2M, and the sectional shape be an N-gonal shape, the phases of the respectively adjacent coils may be endowed with a difference of:

$$360° \times N/(2M).$$

If this value is 180° or greater, a magnetic field which attains the desired N-gonal shape at every point of time cannot be generated, or the rotating direction reverses meaninglessly. To avoid this drawback, N must be smaller than M, and the smallest number for the deformation is N=2 corresponding to the elliptical deformation.

The magnitude of revolution per alternating cycle for the N-angled shape change is 1/N, and does not depend upon the number of coils. In general, the number of coils may be odd as well. In this case, 2M in the above expression may be substituted by (2M'+1).

The power source 64 for the magnetic surface rotating coils supplies alternating currents of various phases. FIG. 2 shows the arrangement of the power source and the method thereof for feeding power to the coils. The power source 64 is composed of a signal generator 65, phase shifters 66, 67 and power amplifiers 68, 69. The signal generator 65 produces an alternating waveform. As the waveform, a sinusoidal wave promises the smoothest operation, but another alternating waveform such as a triangular wave, square wave or saw-tooth wave may well be used. The phase shifters 66 and 67 shift the phases of signals therebetween, making it possible to supply the coils 51–58 with currents of waveforms whose phases shift in succession. In the present example, the phases are shifted every 90° between the adjacent coils in order that the elliptical magnetic surface to-be-changed may be rotated by the eight coils.

Therefore, the coils 51 and 55, 52 and 56, 53 and 57, and 54 and 58 become the same phases, respectively. Among these four sets, the set of the coils 51 and 55 and the set of the coils 53 and 57, and the set of the coils 52 and 56 and the set of the coils 54 and 58 become the opposite phases with the phase shifts of 180°, respectively. Accordingly, the phase shifters 66 and 67 may provide the signals having the phase shift of 90°, and any other phase shifter is unnecessary. In principle, the phase shifter 66 may be directly connected so as to afford null phase difference. In the case where the set of eight coils is arranged at the equal intervals and where the elliptical magnetic surface is rotated, the two phase shifters 66, 67 and the two amplifiers 68, 69 suffice in this manner.

Figure 3:
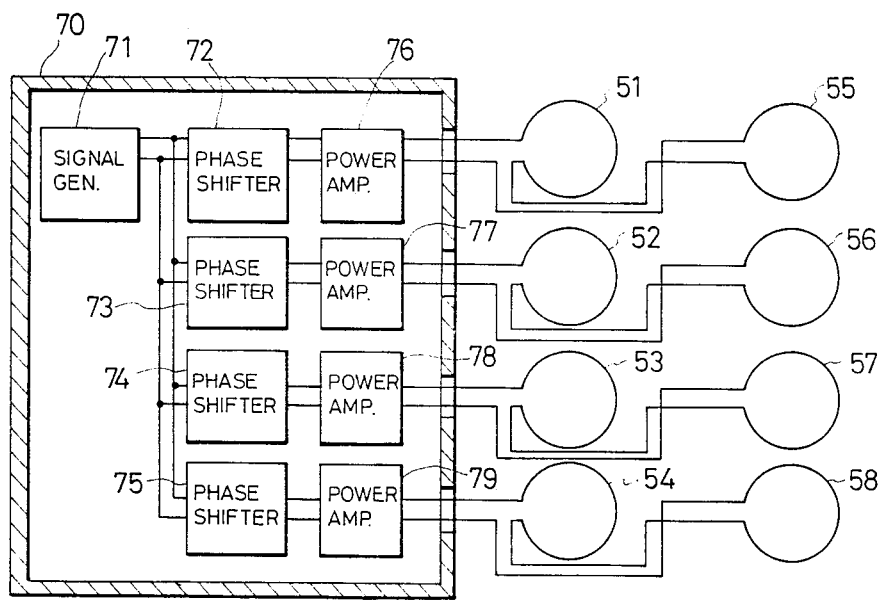

The arrangement of connection in the case of generating and rotating a triangular magnetic surface by the use of eight coils is shown in FIG. 3. The phase difference between the respectively adjacent coils is $360° \times \frac{3}{8} = 135°$, so that the coils 51 and 55 have a phase shift of 540°, namely, the opposite phases. The coils 52 and 56 and the coils 51 and 55 have opposite phases therebetween, respectively, and the former set lags just 135° over the latter set. In a power source 70, accordingly, the combinations of phase shifters 72-75 and amplifiers 76-79 to be connected to a signal generator 71 are required in four sets. In general cases, the phase shifters and the amplifiers which are equal in number to the coils are sufficient.

The alternating current coils may well be non-axisymmetric. An example is a shape in which the coils turn helically around the vacuum chamber 1 as shown in FIG. 4 where the coils are numbered 51'-58'. In this case, the shape of the plasma column 7 does not become axisymmetric, but it becomes a shape twisted at the same pitch as that of the helix. When the helical coils are supplied with alternating currents having phase differences, the twisted plasma column can be rotated.

By constructing the plasma confinement system as in the foregoing embodiment, the plasma column can be rotated, so that the unstable plasma part is quickly moved to the stable part, and the instability of the plasma can be eliminated.

In addition, heat load concentration ascribable to a diverter flux is simultaneously solved by the rotation of a heat flux inflow position during the rotation of the magnetic surface. More specifically, the rotating coils are arranged so that a magnetic neutral point may be formed during the formation of the deformed magnetic surface, and the neutral point is rotated simultaneously with the movement of the whole magnetic surface during the feed of the alternating currents. Then, the diverter heat load is distributed on the entire inside surface of the chamber and is not locally concentrated.

When the magnetic surface is rotated, the magnetic neutral point (separatrix configuration) is simultaneously rotated. Therefore, an impurity particle flux to be separated and emitted can be prevented from continuing to enter a fixed position.

When the plasma is rotated, centrifugal forces act on particles, and heavy ions move toward the exterior of the plasma. The centrifugation is effective when the thermal velocities of ions exceed the rotating velocity of the plasma. In the nuclear fusion plasma, solely heavy hydrogen and tritium play the principal roles, and all the other particles are impurities. Since heavy impurities have low thermal velocities, the rotation of the magnetic surface can serve the separation and emission of the impurities more effectively.

In other words, the impurity inflow flux can be expanded over the entire inside surface of the chamber. Since the mean inflow flux per unit area decreases to about 1/5, the lifetime of the chamber against sputtering becomes 5 times longer.

According to the present invention, the period of time for which a plasma column faces the outer side of a toroid accounts for about ½ of the whole period of time, so that the growth rate of instability becomes ½. Accordingly, the energy confinement time is approximately doubled. In a nuclear fusion apparatus conforming to the system of the invention, the merit appears as a reactivity increment, and the invention is effective to raise the efficiency of the overall plant.

What is claimed is:

1. A plasma confinement system comprising a toroidal vacuum chamber, a toroidal coil which generates a magnetic field in a toroidal direction within said vacuum chamber, current transformer coils which are wound in the toroidal direction, equilibrium magnetic field coils which are wound in the toroidal direction in order to control a plasma, alternating current coils which are wound mainly in the toroidal direction and through which alternating currents are caused to flow for enabling forming and rotating of a deformed non-circular magnetic surface and for causing rotation of the plasma in a poloidal direction, and power source means for causing currents to flow through the various coils.

2. A plasma confinement system as defined in claim 1 wherein said alternating current coils are wound axisymmetrically with respect to a symmetry axis of rotation of said toroidal vacuum chamber.

3. A plasma confinement system as defined in claim 1 wherein said alternating current coils are wound non-axisymmetrically with respect to a symmetry axis of rotation of said toroidal vacuum chamber.

4. a plasma confinement system as defined in claim 1, wherein said alternating current coils are arranged in a plural number in the poloidal direction and are respectively supplied by said power source means with the alternating currents of different phases.

5. A plasma confinement system as defined in claim 1, wherein a rotating angular velocity of w of the deformed magnetic surface satisfies the following formula:

$$\omega > \frac{v_{th}}{r}$$

where $v_{th}$ denotes a thermal velocity of ions and r denotes a radius of the plasma.

6. A plasma confinement system as defined in claim 1 wherein said alternating current coils numbering 2M are arranged at substantially equal poloidal angular intervals, and are fed with the currents so as to shift current phases of the respectively adjacent coils in an amount of:

$$360° \times \frac{N}{2M}$$

where N denotes an integer which is smaller than M and which is at least 2.

7. A plasma confinement system as defined in claim 6, wherein said alternating current coils in a plurality of sets are fed with the currents by and power source means including an alternating signal generator, a plurality of phase shifters and a plurality of power amplifiers.

* * * * *